July 6, 1948.  K. RATH  2,444,674
MULTIPLE LIGHT BAFFLE BRIGHTNESS METER FOR
PHOTOELECTRIC EXPOSURE DETERMINING DEVICES
Filed Nov. 13, 1943
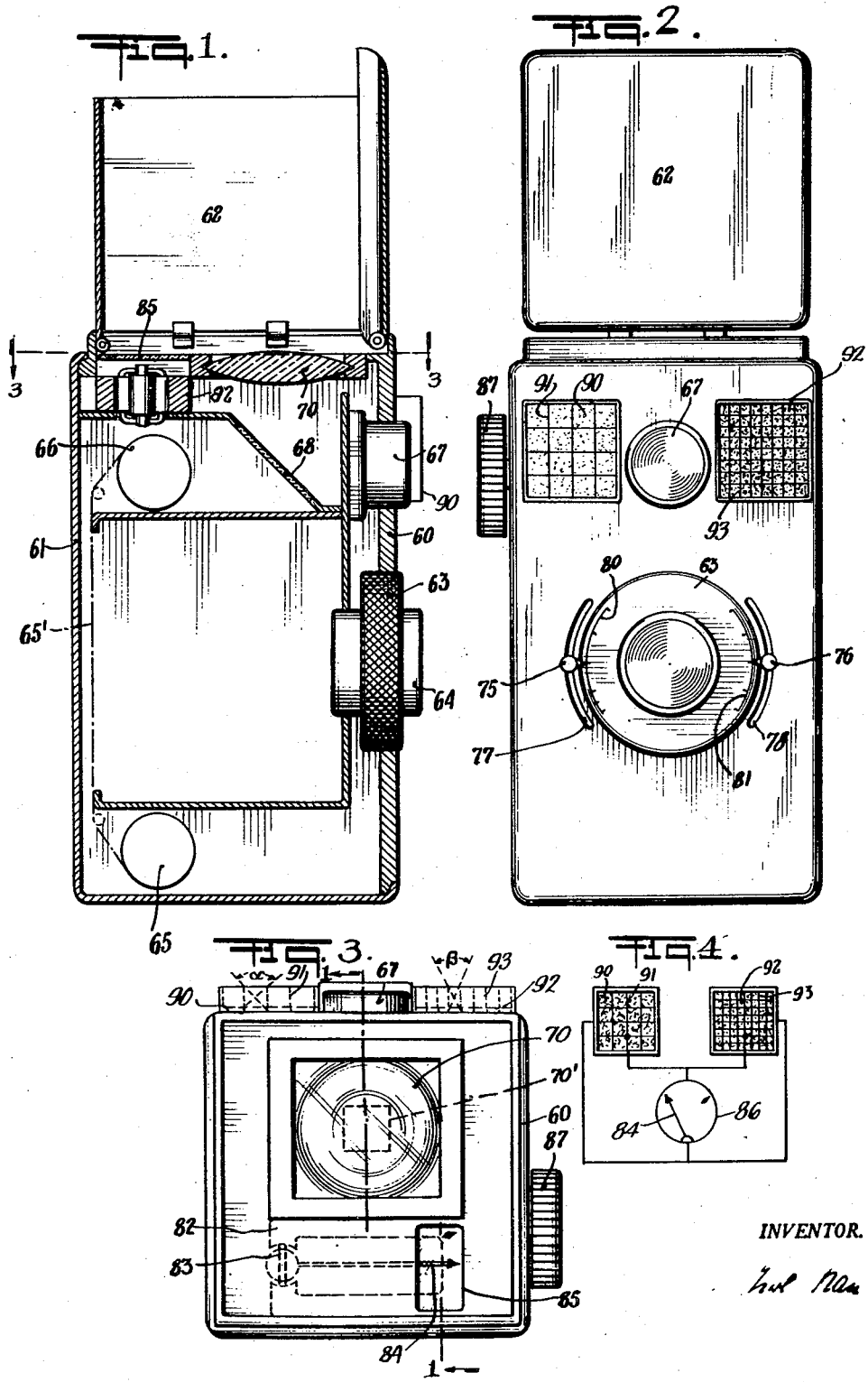
INVENTOR.

Patented July 6, 1948

2,444,674

UNITED STATES PATENT OFFICE 2,444,674

MULTIPLE LIGHT BAFFLE BRIGHTNESS METER FOR PHOTOELECTRIC EXPOSURE DETERMINING DEVICES

Karl Rath, New York, N. Y.

Application November 13, 1943, Serial No. 510,110

4 Claims. (Cl. 88—23)

My invention relates to photoelectric exposure determining devices of the type used as a separate aid or accessory to a camera for determining the proper exposure adjustments to obtain a correctly exposed photograph, as well as devices structurally embodied in and connected with the exposure control means of a camera to afford an automatic or semi-automatic exposure control.

Photoelectric exposure meters usually comprise a photoelectric cell connected to an indicator as a light measuring device, preferably a photo-voltaic or self-generating cell of the cuprous oxide or selenium type. Such cells have an extended light sensitive surface arranged to be excited by the light beam or bundle emanating from a photographic object or scene towards which the meter is aimed in the operative position. The electric current generated by the cell and exciting the indicator is substantially proportional to the light intensity or scene brightness and serves as a basis for determining the proper exposure settings or for directly controlling the adjustment of one or more exposure control organs of a camera.

A characteristic property of photoelectric cells of this and other types known is the fact that the light intensity measured represents the average or integrated value of the individual brightness values of different portions or elementary areas of a scene, whereby a correct exposure is insured only in those relatively rare cases, such as in some cases of landscape and architectural photography, where the brightness or brightness contrast is more or less evenly distributed over the entire scene area or where all the objects of a scene are of more or less equal interest or pictorial value and are to be equally rendered in the final print. Such cases are, however, the exception rather than the rule in practice.

Thus, in pictorial photography and in general in keeping with the present trends in photography in almost any other case, it is desirable to expose the camera to obtain a proper rendering of a desired limited object or fractional area of a scene without regard to the remaining portions to result in a desired pictorial interest value or esthetic effect of the final print.

These latter endeavors have, however, not been easily and fully realizable with exposure meters of the present known type responsive to the average or integrated brightness, since in such meters both the object of interest as well as the surrounding area or background are equally effective in producing the response current of the photoelectric cell serving as the basis for the exposure determination or adjustment. Thus, in the case of a bright object set against a dark background the correct exposure should be determined on the basis of the object brightness only leaving the background to take care of itself due to the latitude of the film or plate used, in order to obtain a picture of high pictorial and artistic value. With a meter responsive to the total average or integrated brightness, however, the dark background will act to depress the effective object brightness, resulting in an overexposed picture and corresponding loss of detail and pictorial value of the print as is understood. On the other hand, in the case of a dark object set against a relatively bright background, the presence of the latter has the effect of raising the effective object brightness, resulting in an under-exposed picture and in turn loss of contrast and reduced pictorial value.

Experienced photographers have sought to remedy these defects and manufacturers have supplied detailed instructions for use with their meters by suggesting suitable correction factors or by advising the photographer to approach the scene or object so as to encompass the object of preferred interest only by the meter view angle, or by providing adjustable baffle devices or other means to control the acceptance angle of the meter so as to encompass a limited area to be correctly rendered in preference to the remaining portions of the scene. All these means and precautions, however, require special adjustments and consideration in each case and accordingly have been successful only in the hands of the more experienced amateurs and professional photographers.

Accordingly, an object of my invention is to provide a photoelectric exposure meter embodying means for automatically taking into consideration the contrast between a pictorial important portion or object of preferred interest within a photographic scene in such a manner as to result in a final exposure determination or adjustment doing preferred justice to said object to obtain a desired pictorial effect substantially without any adjustments or other cumbersome precautions to be taken on the part of the photographer.

The above and further objects and aspects of my invention will become more apparent from the following detailed description of several practical embodiments taken in reference to the accompanying drawing forming part of this specification and showing, by way of example, a photoelectric brightness meter according to the invention embodied in a photographic camera.

In the drawing:

Figure 1 is a vertical cross-sectional view of a known type of twin-lens reflex camera embodying a light or scene brightness meter constructed in accordance with the principles of the invention;

Figure 2 is a front view of the camera shown in Figure 1;

Figure 3 is a horizontal section taken on line 3—3 of Figure 1; and

Figure 4 is a wiring diagram showing the electric connection of the photoelectric cells and indicator of the previous views.

Like reference characters denote like parts in the different views of the drawing.

The photoelectric cells used by the invention are preferably of the self-generating or photovoltaic type comprising, in a known manner a base electrode or plate covered with a layer of light sensitive material (crystalline selenium, cuprous oxide, etc.) which latter is in turn coated with a translucent metallic covering electrode connected with a suitable terminal member (metal ring, etc.), the cooperating terminal of the cell being constituted by the base electrode in a manner well known to those skilled in the art. The cell may be suitably mounted upon the body of the camera so as to be aimed towards and to encompass a photographic scene by its view or acceptance angle in the operative position coinciding with the picture field or view angle of the camera objective. This position may be ascertained by observing the camera view finder of any suitable construction. In order to obtain a limited acceptance or view angle for the photoelectric cell corresponding to the camera lens or picture angle, any means known for this purpose such as a cellular baffle, multiple lens baffle, or the like may be provided for the purpose of the invention.

With the above objects in view, the invention involves in general the provision of a photoelectric brightness meter for use in connection with a photographic exposure determining device, said meter comprising first photoelectric cell means provided with acceptance angle limiting means encompassing a scene to be photographed in the operative position of said meter. There are furthermore provided according to the invention second photoelectric cell means having acceptance angle limiting means of lesser angular spread than and arranged in relative fixed relation to said first photoelectric means, to encompass a centrally positioned predetermined fractional area of said scene, and view finder means for indicating the relative areas of response of both said first and second photoelectric means. The output currents of both photoelectric cells, one of which is responsive to the total integrated scene brightness, while the other is responsive to the brightness of said fractional scene area which may be ascertained and controlled by the operator by means of the view finder, are combined in shunt and like polarity relation and passed through a current responsive device, whereby the total current through said device will be composed of two components varying, respectively, in accordance with the total and fractional scene brightness values, in such a manner as to substantially compensate for the above mentioned error due to any brightness difference between said areas.

Referring to Figures 1 to 3, I have shown by way of example a camera of the well known twin-lens reflex type embodying brightness meter according to the invention. The numeral 60 represents the camera body having a detachable back 61 and provided with a collapsible focusing hood 62 shown in the open or operative position in the drawing. Item 63 represents the shutter mounted around the lens 64 and items 65 and 66 are the film supply and take-up spools for the film 65' passing through the film gate in the focal plane of the camera. Numeral 67 represents the view finding lens, 68 is the reflecting mirror and 70 a ground glass or lens for producing an enlarged image of the scene encompassed by the picture taking lens 64 in the finder viewed in the focusing hood 62. The picture taking and view finding lenses may be connected for synchronized focusing in a manner well known and not shown in the drawing, suitable means being provided to compensate for the different focal lengths of these lenses, as is understood.

The camera is arranged for uni-control with the lens aperture and exposure time adjusting knobs 75 and 76, are arranged to move within arcuate slots 77 and 78 in the front wall of the body 60 and are provided with pointers cooperating with the stop and exposure time scales 80 and 81, respectively. The current indicator having a moving coil 83 and pointer 84 is mounted adjacent to the lens or ground glass 70 and protected by a suitable cover provided with a window 85 for viewing the pointer 84 in the open position of the focusing hood 62.

Item 87 represents a winding knob for moving the film from the supply spool to the take-up spool.

The two photoelectric cells 90 and 92 provided with baffles 91 and 93 are mounted on opposite sides of the finder lens 67 and connected in parallel relation to the indicator 83. The baffle 93 of cell 92 has a limited acceptance angle $\beta$ compared with the angle $\alpha$ of baffle 91 of cell 90, with both angles pointing in the same direction as shown in Figure 3, the latter angle encompassing the entire picture scene or area and the former angle encompassing a limited area suitably identified in the view finder of the camera as shown at 70' in Figure 3. If both areas encompassed by the cells 90 and 92 have the same brightness, the resultant current will have a value greater than the current supplied by one cell assuming both cells to be of the same size. If the brightness of the cell of limited angle is greater than the average brightness of the entire area covered by the cell of larger angle, the former will contribute a greater current resulting in an increased resultant indication in such a manner as to do justice to the increased brightness of the object of interest covered by the limited angle or relative picture area, provided the camera is properly aimed so that the object of interest (head of a person, etc.) falls within the area 70' marked in the view finder 70. If the object of interest has a lower brightness than the background, the respective current will be less than the current supplied by the other cell, resulting in a lower combined current and compensation in the opposite manner. Figure 4 more clearly shows the electric connection of the two photoelectric cells 90 and 92 and the electrical indicator 86 which has a pointer 84. Both cells are arranged in shunt relation and directly connected across the indicator in accordance with the basic thought and principle of the invention.

The baffles shown in the drawing are of the well known cellular type comprising a plurality of spaced walls 91 and 93, respectively, at right angles to each other and to the light sensitive surface of the photoelectric cells. In this case, the acceptance angles are determined by the spacing and depth of the small chambers thus formed in front of the light sensitive surfaces. As will be understood, however, any other known means for obtaining a limited angular response, such as multiple lens arrangements in front of the light sensitive surface may be employed for the purposes of the invention.

The "true" object brightness indicated by a meter constructed in accordance with the invention may be utilized for determining the proper exposure setting or to directly adjust an exposure control organ of a camera by means of any of the various systems and devices of this type known in the art. Furthermore, the arrangement shown may be in the form of a separate unit embodying a suitable view finder for identifying the respective scene areas and being provided with a suitable computing or calculating device. The latter may comprise a number of relatively adjustable scale members for manually converting an object or scene brightness read into appropriate lens aperture and shutter speed values for a given film speed and other constants entering into the final exposure determination.

It will be evident from the foregoing that the invention is not limited to the specific details, arrangements of parts and constructions shown and disclosed herein for illustration, but that the underlying basic principle and novel thought are susceptible of numerous modifications and variations coming within the broader scope and spirit of the invention as defined in the appended claims. The specification and drawing are accordingly to be regarded in an illustrative rather than in a limited sense.

I claim:

1. In a photographic exposure determining device of the type comprising a photoelectric brightness meter and means for utilizing the response thereof for determining the exposure adjustment of a camera, said meter comprising first photoelectric means having acceptance angle limiting means encompassing a scene to be photographed in the measuring position of said meter, second photoelectric means having acceptance angle limiting means of lesser angular spread than and in relatively fixed relation to said first acceptance angle limiting means to encompass a centrally positioned predetermined fractional area of said scene, view finder means for indicating the relative scene areas encompassed by both said first and second acceptance angle limiting means, a current responsive means, and means for shunting both said photoelectric means in like polarity relation across said current responsive means.

2. In a photographic exposure meter of the type comprising a photoelectric brightness meter and means for utilizing the response thereof for determining the exposure adjustment of a camera, said meter comprising first photoelectric means having acceptance angle limiting means encompassing a scene to be photographed in the measuring position of said meter, second photoelectric means having acceptance angle limiting means of lesser angular spread and in relatively fixed relation to said first acceptance angle limiting means to encompass a centrally positioned predetermined fractional area of said scene, view finder means for indicating the relative scene areas encompassed by both said first and second acceptance angle limiting means, a current indicator, and circuit connecting means for shunting both said photoelectric means in like polarity relation across said indicator.

3. In a photoelectric exposure meter of the type comprising a photoelectric brightness meter and means for utilizing the response current thereof for determining the exposure adjustment of a camera, said meter comprising a first photovoltaic cell provided with a light baffle encompassing a scene to be photographed in the measuring position of said meter, a second photovoltaic cell provided with a light baffle of lesser angular spread than and in relatively fixed relation to said first light baffle to encompass a centrally positioned predetermined fractional area of said scene, a view finder in fixed relation to said meter and having means for indicating the relative scene areas encompassed by both said first and second light baffles, current responsive means, and circuit connecting means for shunting both said cells in like polarity relation across said current responsive means.

4. In a photoelectric exposure meter of the type comprising a photoelectric brightness meter and means for utilizing the response current thereof for determining the exposure adjustment of a camera, said meter comprising a first photovoltaic cell provided with a light baffle encompassing a scene to be photographed in the measuring position of said meter, a second photovoltaic cell provided with a light baffle of lesser angular spread than and in relatively fixed relation to said first light baffle to encompass a centrally positioned predetermined fractional area of said scene, a view finder in fixed relation to said meter and having an indicating field corresponding to the scene area encompassed by said first light baffle, and means delineating said fractional area within said field encompassed by said second light baffle, current responsive means, and circuit connecting means for shunting both said cells in like polarity relation across said current responsive means.

KARL RATH.

REFERENCES CITED

The following references are of record in the file of this patent:

UNITED STATES PATENTS

| Number | Name | Date |
| --- | --- | --- |
| 1,244,159 | Asdit | Oct. 23, 1917 |
| 2,137,548 | Strauss | Nov. 22, 1938 |
| 2,154,324 | Couyoumdjian | Apr. 11, 1939 |
| 2,183,217 | Goldsmith | Dec. 12, 1939 |
| 2,268,105 | Bing | Dec. 30, 1941 |
| 2,302,297 | Bing | Nov. 17, 1942 |
| 2,285,761 | Tonnies | June 9, 1943 |
| 2,382,220 | Fogle | Aug. 14, 1945 |

OTHER REFERENCES

Ser. No. 357,992, Riszdorfer (A. P. C.), published May 4, 1943. 88—23G.